United States Patent [19]

Rondel et al.

[11] Patent Number: 4,674,400
[45] Date of Patent: Jun. 23, 1987

[54] PORTABLE BEVERAGE BREWER

[75] Inventors: Stephen A. Rondel, Redmond; David B. Petrich, Seattle, both of Wash.

[73] Assignee: Advanced Products & Technologies, Redmond, Wash.

[21] Appl. No.: 763,954

[22] Filed: Aug. 8, 1985

Related U.S. Application Data

[63] Continuation-in-part of Ser. No. 658,867, Oct. 9, 1984, abandoned.

[51] Int. Cl.⁴ .................. A47J 31/00; A47J 33/00
[52] U.S. Cl. .................................... 99/279; 99/295
[58] Field of Search ............. 99/279, 284, 291, 295, 99/298, 299, 300, 302 R, 304, 305, 306, 307, 316, 317, 290, 285, 280, 281, 282, 283; 426/433

[56] References Cited

U.S. PATENT DOCUMENTS

| | | | |
|---|---|---|---|
| 2,743,664 | 5/1956 | Dale | 99/306 |
| 4,328,740 | 5/1982 | McDonough | 99/295 |
| 4,382,402 | 5/1983 | Alvarez | 99/295 |
| 4,495,404 | 1/1985 | Carmichael | 99/279 |
| 4,506,597 | 3/1985 | Karns et al. | 99/295 |

FOREIGN PATENT DOCUMENTS 627659  8/1949  United Kingdom ................ 99/305

Primary Examiner—Robert W. Jenkins
Attorney, Agent, or Firm—Graybeal, Jensen & Puntigam

[57] ABSTRACT

A self-contained, self-storing, compact hot beverage brewing device including a base member (2) including the heating and control elements, a water receiving container (6) which also serves as part of the storage container, a brewing element (10) movable from a position exterior to (6) during the brewing operation to a position interior of (6) in the storage operation and a brew receiving cup (14) which in the stored condition is placed over the top of (6) making a compact self-storing package. The brewing element (10) allows the user to by means of selector valve (12) control the strength and quality of the resultant beverage.

8 Claims, 14 Drawing Figures

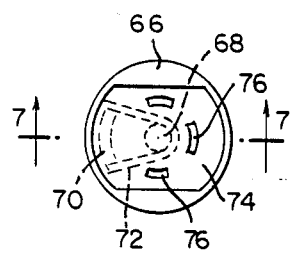
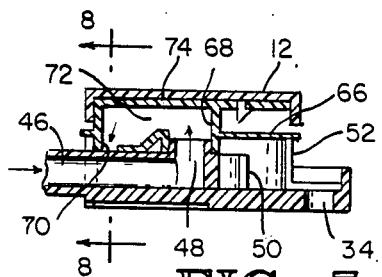
FIG. 6  FIG. 7
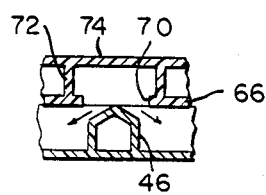
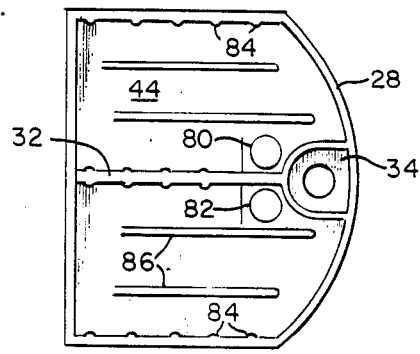
FIG. 8
FIG. 9
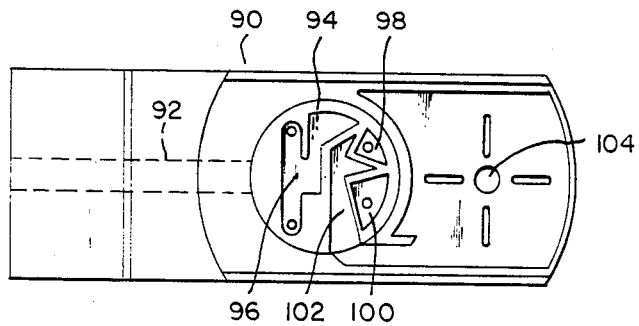
FIG. 10
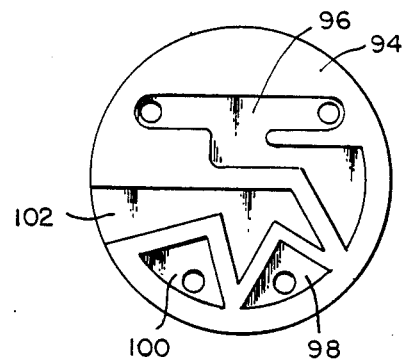
FIG. 11

PORTABLE BEVERAGE BREWER

The present application is a continuation-in part of application Ser. No. 658,867, filed Oct. 9, 1984, now abandoned.

DESCRIPTION

1. Technical Field

This invention relates to devices for brewing coffee, tea or other heated beverages and more particularly to a compact portable brewing device which incorporates the capability of selectively brewing a selection of beverages. The device has the various parts sized and shaped such that the parts may be configured into a compact totally enclosed self-storing unit for travel and ease of transport to office, home or school.

2. Background Art

Coffee and beverage makers for homes and for the traveler are well known and come in large variety of styles and methods of operation. These devices, however, are generally limited to the broad categories of purculator or immersion heaters.

Devices designed for home use, while offering many convenient features such as automatic turn-on/-turn-off and means to adjust the strength of the finished brew are generally too bulky and inconvenient for use when traveling.

Those devices specifically designed for traveling generally consist of a means to heat water thus relegating the consumer to "instant" beverages and requiring the carrying of a cup or the like for containing the beverage.

DISCLOSURE OF THE INVENTION

With the above noted prior art in mind, it is an object of the present invention to provide a compact portable self-contained unit enabling a user to automatically brew a hot beverage upon demand whether in a hotel room, office or at home.

The invention satisfies smaller space restrictions of a desk or nightstand, and is acceptable to a convenient method transport such as a briefcase or shoulder bag.

It is another object of the present invention to provide a self-contained portable brewing device enabling the user to select the grind and/or strength of his beverage.

It is a further object of the present invention to have the various portions of a portable hot beverage brewing device be of such a size and interrelationship that they fit together in a compact self-contained package totally enclosing the water reservoir and preventing any leakage.

Still a further object of the present invention is to provide a device for brewing hot beverage by individual cup but providing maximum versatility and selectivity. The device is capable of making two successive cups without reloading the filter basket since selection of one of two or a combination of both is possible. For hot water only, the number is unlimited.

Still another object of the present invention is to provide a device which allows the user to "brew" a premeasured quantity of coffee or tea or alternatively heat a premeasured quantity of water.

Further objects of the present invention include providing a totally enclosed brewing device which when in the closed position, does not leak and therefore need no separate container, a brewing device which while small and inexpensive, incorporates features allowing maximum selectivity for the user, and a device which because of its construction, is inexpensive and includes an automatic shutoff.

BRIEF DESCRIPTION OF THE DRAWINGS

FIG. 6 is a plan view of the preferred selector valve.

FIG. 7 is a vertical section taken along lines 7—7 of FIG. 6 with the selector valve in position for use.

FIG. 8 is a vertical section along lines 8—8 of FIG. 7.

FIG. 9 is a plan view of the brewing compartment with the selector valve and brewing baskets removed.

FIG. 10 is a plan view of an alternative selector valve structure.

FIG. 11 is an enlarged plan view of the alternate selector valve.

DETAILED DESCRIPTION OF THE DRAWINGS

Figure 1:
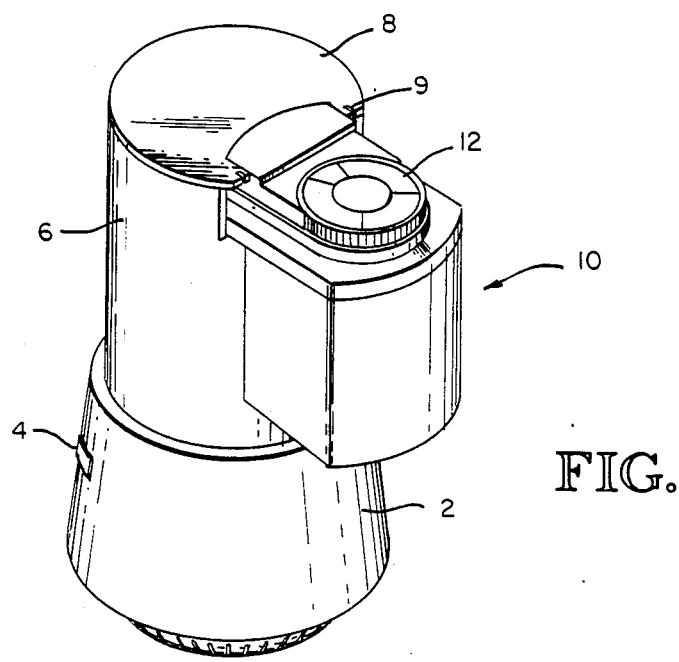
FIG. 1 represents the compact brewing device assembled for use.

As seen in FIG. 1, the present invention comprises a base unit 2 which includes an appropriate heater and associated control switch 4 as well as an upstanding container element 6 having a cover 8 hingedly secured at 9 and a detachable brewing device 10 which may selectively be placed as shown in FIG. 1 or as described hereinafter placed within the container 6 for storage and travel.

Figure 2:
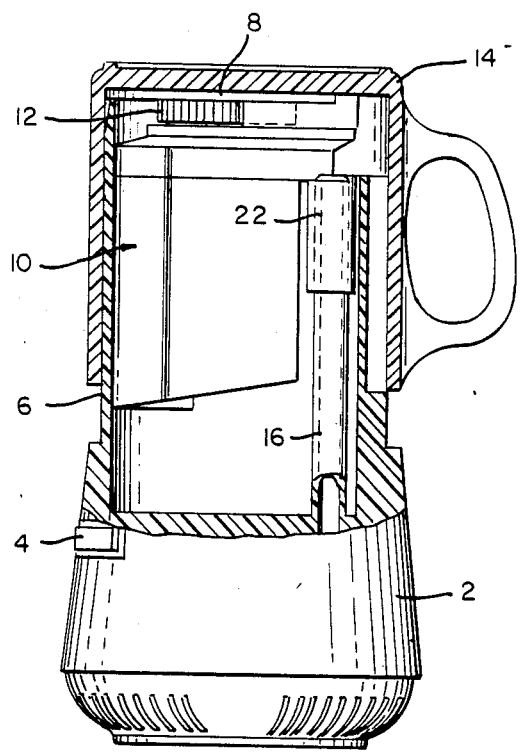
FIG. 2 is a partial vertical section with the device in travel or stored configuration.

Referring now to FIG. 2, the device is shown in the storage or transport configuration and the brewing chamber 10 has been moved so that it is contained entirely within the upwardly open chamber 6. Note that lid 8 now overlies the brewing chamber. The cup 12 which is used to receive the hot liquid is placed in an inverted condition over the top of upwardly open container 6 and its contained brewing chamber 10 to form a small compact self-contained unit. As will be explained in greater detail hereinafter, the brewing container 10 is telescopically received over upright supply tube 14 in both its stored and brewing configurations.

Figure 3:
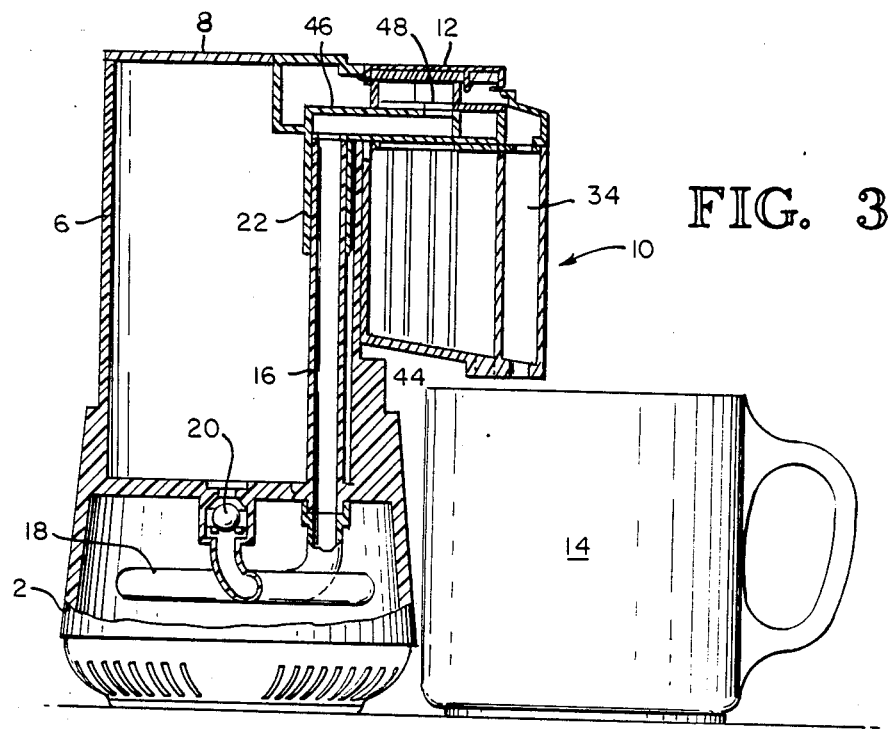
FIG. 3 is a partial vertical section with the device in the brewing configuration.

As seen in FIG. 3, the base portion 2 contains a heating tube 18. Water placed within the upwardly open container 6 is permitted to flow into the tube 18 via one-way valve 20, is rapidly heated by an electrical resistance heater (not shown for clarity) and is moved upwardly through hollow tube 16 and enters the brewing section 10 via downwardly projecting mating hollow tube member 22. The hot liquid passes through the control valve 12, as explained hereinafter, and descends downwardly through the brewing chamber previously selected and is deposited in cup 14. The heating of the water can be done by any one of several standard heating devices and/or methods using electrical current and is not considered to be a portion of this invention.

The control of the heating is by a bimetallic switch indicated as 4 in FIGS. 1 and 2 which terminates the flow of electricity upon reaching an overheated condition which occurs when all water is evacuated. The premeasured fluid is moved through the heater by a combination of gravity and convective forces and the one-way valve prevents fluid from re-entering the container and further, generates up a pressure system when the fluid is essentially gone and the remaining fluid becomes superheated within the tube 18 forcing the remaining fluid upwardly into the brewing area. It is to be noted that the placement of the vertical transport tube 16 in the interior of the container 6 allows some preheating of the water contained therein.

Figure 4:
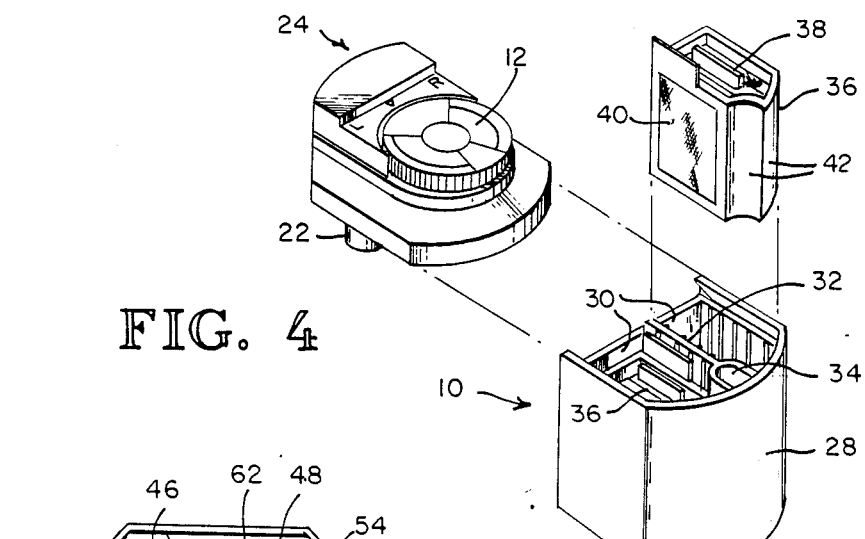
FIG. 4 is an exploded view of the brewing portion of the inventive device.

Referring now to FIG. 4, which is an exploded view of the brewing portion of the present invention generally designated as 10, it can be seen that the brewing portion includes an upper element 24 which includes the downwardly extending hollow tube 22, the selector valve 12 and the necessary internal plumbing as described hereinafter. The lower section generally designated as 26 includes a hollow shell 28 having a pair of identical interior compartments 30 separated by a wall 32 and including along its outer wall an open vertical conduit 34. The shell 26 and formed compartments 30 each include a filter basket 36 configured to fit within the compartment 30 and including a hinged top portion 38 and a plurality of filter screens 40 located on all surfaces with the exception of the compound curved surface 42.

In operation, the heated liquid is directed by distributor valve 12 in accord with the selection of the consumer and if so desired will direct the flow of water into either botrh or neither of the two brewing baskets, where it will become flavored and flow quickly outwardly through the screen area and downwardly to the sloping bottom 44 of the brewing section and out into the waiting cup.

Referring once more to FIG. 3, it is to be noted that the water upon being heated in conduit 18 forced upwardly through conduit 16 and 22 laterally in conduit 46 and then upwardly through opening 48 into the selector valve 12 by which means it is directed to either one or both of the brewing chambers or alternatively to exit via conduit 34 as hot water.

Figure 5:
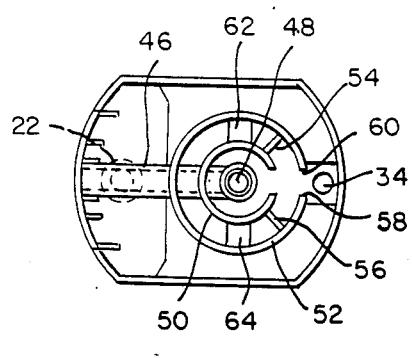
FIG. 5 is a plan view of the brewing portion of the inventive device with the selector valve removed.

As seen in FIG. 5, which shows the upper portion of the brewing section with the selector valve removed, the conduits 22 and 46 interconnected with upwardly standing conduit 48 may be seen. Upwardly standing conduit 48 which is circular in cross-section also serves as the mount for the distributor valve as explained hereinafter. The distributor valve is further supported by upstanding circular configured walls 50, 52 having interconnecting walls 54, 56 thus defining in conjunction with the outer surface of conduit 46 three distinct and defined chambers. Water in the chamber defined by walls 54, 56 and the radially aligned openings 58, 60 will flow outwardly and downwardly through conduit 34. Water placed in the chamber defined by conduit 46 and wall 54 will flow downwardly through opening 62 and thus into the right hand brewing chamber. Water in the section defined by conduit 46 and wall 56 will flow downwardly through opening 64 and into the left brewing chamber. As explained hereinafter by appropriate selection of placement of the selector valve water can be directed solely to one of the three hereinabove defined chambers or alternatively may be directed into two chambers simultaneously permitting a blend or affecting the strength of the brew.

One embodiment of the selector valve itself is shown in plan view in FIG. 6. As can be seen in this view, the valve comprises a lower circular disk 66 which is solid with the exception of the central opening 68 to receive conduit 48 and an arcuate opening 70 through which liquid will flow downwardly. A substantially V-shaped wall 72 is sealingly secured to disk 66 and encompasses within its defined wall the opening 68 and the opening 70 such that liquid entering the distributor valve through 68 can only exit through 70. The upper portion of the distributor valve comprises a partially circular disk 74 sealingly secured to wall 72 and including openings 76 to receive a cap member 12 which includes imprinted thereon a legend such that the operator can define the brew desired.

Referring now to FIG. 8, it can be seen that when the flow control valve is in the position as shown in FIG. 7, the hot water will pass downwardly through opening 70 and be deflected in both directions by the exterior of conduit 46 thus flowing into both chambers and exiting through openings 62, 64 and thus into both chambers 30 of shell 28 causing liquid to pass both of the baskets producing a brewed blend or alternatively if a basket empty, a weaker brew.

Referring now to FIG. 9, the brew chamber itself can be seen, bottom 44 slopes towards the curved end such that liquid will flow to openings 80 or 82 and thus into the cup which is placed in position shown in FIG. 3. It is to be noted that the sidewalls and the bottom wall each contains outwardly projecting ribs 84, 86 to assist the liquid to flow towards the appropriate opening and to maximize the brewing efficiency by allowing the liquid to pass outwardly through the screens 40 of the baskets. The ribbed sidewalls also serve to prevent spillage by accommodating any basket overflow.

Figure 12:
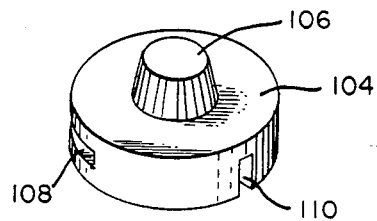
FIG. 12 is a view of the distributor cap for the alternate selector valve.
Figure 13:
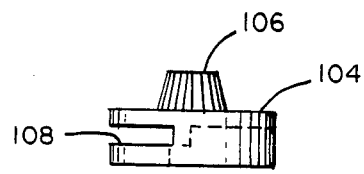
FIG. 13 is an exploded view of the selector valve of FIG. 12 with the associated display cap.
Figure 14:
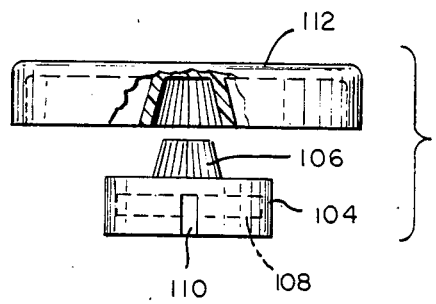
FIG. 14 is an exploded side elevation of the distribution valve and selector.

An alternate embodiment of the flow valve is depicted in FIGS. 10–12. Basically, the brewing structure would be identical to that previously although slightly different dimensions to accommodate the structural changes. As seen in FIG. 10, the element shown and indicated as 90 would form the upper portion of the brew chamber and serve as the distribution element with the hot fluid being carried horizontally by conduit 92 and entering the distribution chamber itself slightly elevated above distributor unit 94 which includes depressed area 96 such that fluid entering this area will flow into each of the baskets whereas fluid entering depressed areas 98 and 100 will flow into individual brewing chambers. Fluid disbursed to recessed area 102 will flow outwardly to opening 104 and thus directly to recipient cup as hot water.

Valve element 94 depicted in FIG. 10 is shown in enlarged view in FIG. 11 and it is again pointed out that the areas 96–100 are recessed and thus control the flow of water. Each of the recessed areas 96–100 include at least one opening which can be selectively aligned with various brewing baskets.

Secured to the top of distribution element 94 is distribution valve 104 which includes an upwardly projecting knob 106 for ease of rotary movement. A water receiving slot 108 extends substantially halfway through the element 104 such that fluid passing through conduit 92 will enter slot 108 and be specifically directed by vertically oriented slot 110. The relative location of the slots 108, 110 can further be depicted by a combination of views 13 and 14. The slot 108 is broad enough such that when the selector cap is appropriately placed to indicate the intended brew the fluid will still enter 108 and have its exit limited to 110 and thus will be appropriately directed to recessed area of choice 96–102 of distributor element 94.

Thus as can be seen, the present invention contemplates a small compact and unique brewing device capable of being easily used in the home, office or carried while traveling.

We claim:

1. A self-contained, self-storing compact hot beverage brewing device wherein the receptacle for the water to be brewed also serves as the storage receptacle for the brewing element and wherein the receptacle for the brewed hot liquid serves as a part of the exterior package during storage or travel comprising:
   a base unit including a receptacle for the water to be used, a heating element and the necessary conduits to direct the heated water to a brewing element,
   a brewing section including at least one receptacle having a filter for drip brewing coffee, tea or the like, a selector valve to divert the hot water and conduit means to direct the hot liquid to a cup,
   cup means to receive the brewed liquid and to serve as a cover closing the top of the receptacle during storage or travel.

2. A beverage brewing device as in claim 1 and further including a removable filter device.

3. A self-contained self-storing device for selectively heating water or brewing a beverage comprising:
   a main body portion including a reservoir for containing the water to be heated, said reservoir including a drain hole in the bottom thereof, a heating tube in communication with the drain hole at its first end and with an upwardly projecting hollow post within the reservoir at its second end,
   a dispensing and filtering apparatus selectively movable from a first position within the reservoir for storage to a second position substantially exterior to the reservoir, said dispensing and filtering apparatus including an upper unit including a downwardly projecting open ended tube to mate with the hollow post in both first and second positions and a selector valve and a lower removable unit including at least one removable filter basket, and
   cup means for receiving the beverage of a size to close the reservoir when inverted and placed over the top thereof whereby the entire unit is compact and self-contained.

4. A brewing device which permits selective brewing including, strength of brew, blending of brews or alternatively a bypass comprising:
   a main brewing chamber including at least one vertical dividing wall dividing the chamber into at least two subchambers,
   selector valve means mounted above the brewing chamber, said selector valve means including an inlet port to receive the hot water to be used in brewing and at least two outlet ports, one in communication with each subchamber,
   deflector means mounted for rotational movement, said deflector means being infinitely adjustable such that it receives water from the inlet port and directs it to one or both of the outlet port and further can direct it to the bypass avoiding the brewing chamber.

5. A self-contained, self-storing compact hot beverage brewing device wherein the receptacle for the water to be brewed may also serve as a storage receptacle for the brewing element and wherein the receptacle for the brewed hot liquid may serve as a part of the exterior package during storage or traveling comprising:
   a base unit including a receptacle for the water to be used, a heating element and the necessary conduits to direct the heated water to a brewing element,
   a brewing element including at least one receptacle for drip brewing coffee, tea or the like and means to direct the hot liquid to a cup,
   cup means to receive the brewed liquid.

6. A beverage brewing device as in claim 5, and further including a selector valve to divert the hot water to a preselected receptacle.

7. A beverage brewing device as in claim 6 and further including a bypass for deliverying unflavored hot water.

8. A beverage device as in claim 5 wherein the cup means is used as a cover for the receptacle during storage or travel.

* * * * *